(12) United States Patent
Obara et al.

(10) Patent No.: US 11,067,303 B2
(45) Date of Patent: Jul. 20, 2021

(54) AIR-CONDITIONING APPARATUS

(71) Applicant: Mitsubishi Electric Corporation, Tokyo (JP)

(72) Inventors: Koichi Obara, Tokyo (JP); Masahiko Takagi, Tokyo (JP); Yasuhiro Suzuki, Tokyo (JP); Kenyu Tanaka, Tokyo (JP); Kazuki Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/461,402

(22) PCT Filed: Feb. 1, 2017

(86) PCT No.: PCT/JP2017/003611
§ 371 (c)(1),
(2) Date: May 16, 2019

(87) PCT Pub. No.: WO2018/142509
PCT Pub. Date: Aug. 9, 2018

(65) Prior Publication Data
US 2019/0346165 A1    Nov. 14, 2019

(51) Int. Cl.
*F24F 11/36*    (2018.01)
*F24F 11/89*    (2018.01)
*F24F 13/20*    (2006.01)

(52) U.S. Cl.
CPC .............. *F24F 11/36* (2018.01); *F24F 11/89* (2018.01); *F24F 13/20* (2013.01)

(58) Field of Classification Search
CPC .. F24F 11/36; F24F 11/89; F24F 13/20; F24F 1/0007; F24F 1/0068; F24F 2110/65
See application file for complete search history.

(56) References Cited

U.S. PATENT DOCUMENTS

2002/0178738 A1   12/2002   Taira et al.
2013/0333408 A1*  12/2013   Meijer ................. F24F 5/0035
                                                62/314

(Continued)

FOREIGN PATENT DOCUMENTS

CN   204648457 U   9/2015
EP     2679921 A2   1/2014

(Continued)

OTHER PUBLICATIONS

Office Action dated Jun. 2, 2020 issued in corresponding JP patent application No. 2018-565141 (and English translation).

(Continued)

*Primary Examiner* — Henry T Crenshaw
(74) *Attorney, Agent, or Firm* — Posz Law Group, PLC (57) ABSTRACT

An air-conditioning apparatus includes a refrigerant circuit in which refrigerant is circulated, and an indoor unit configured to accommodate a load-side heat exchanger of the refrigerant circuit. The indoor unit includes an air outlet provided in the housing, an air inlet provided in the housing below the air outlet, an air passage that extends between the air inlet and the air outlet via the load-side heat exchanger, a refrigerant detection unit disposed below the air inlet, and a first partition plate configured to separate the air passage from a space in which the refrigerant detection unit is installed.

6 Claims, 6 Drawing Sheets

(56) References Cited

U.S. PATENT DOCUMENTS

| | | | |
|---|---|---|---|
| 2015/0121943 A1* | 5/2015 | Ishino | F24F 13/20 62/426 |
| 2016/0109162 A1 | 4/2016 | Suzuki et al. | |
| 2017/0343258 A1 | 11/2017 | Yamaguchi et al. | |

FOREIGN PATENT DOCUMENTS

| | | | |
|---|---|---|---|
| JP | S63-27859 U | | 2/1988 |
| JP | H08-06172 A | | 3/1996 |
| JP | H08-61702 | * | 3/1996 |
| JP | 2990570 B2 | | 12/1999 |
| JP | 2002-098346 A | | 4/2002 |
| JP | 2005-049004 | * | 2/2005 |
| JP | 2005-049004 A | | 2/2005 |
| JP | 4599699 B2 | | 12/2010 |
| JP | 2011-092751 A | | 5/2011 |
| WO | 2016/151642 A1 | | 9/2016 |

OTHER PUBLICATIONS

Office Action dated Jul. 3, 2020 issued in corresponding CN patent application No. 201780084693.9 (and English translation).

Examination Report dated Nov. 21, 2019 issued in corresponding AU patent application No. 2017396590.

Extended European Search Report dated Dec. 17, 2019 issued in corresponding EP patent application No. 17894703.2.

International Search Report of the International Searching Authority dated Apr. 4, 2017 for the corresponding international application No. PCT/JP2017/003611 (and English translation).

European Office Action dated May 4, 2021, issued in corresponding European Patent Application No. 17894703.2.

Chinese Office Action dated May 26, 2021, issued in corresponding CN Patent Application No. 201780084693.9 (and English translation).

\* cited by examiner

AIR-CONDITIONING APPARATUS

CROSS REFERENCE TO RELATED APPLICATION

This application is a U.S. national stage application of PCT/JP2017/003611 filed on Feb. 1, 2017, the contents of which are incorporated herein by reference.

TECHNICAL FIELD

The present invention relates to an air-conditioning apparatus including a refrigerant detection unit configured to detect refrigerant leakage.

BACKGROUND ART

Patent Literature 1 describes an indoor unit of an air-conditioning apparatus. The indoor unit includes a heat exchange chamber, and a machine chamber. A heat exchanger through which flammable refrigerant flows is disposed in the heat exchange chamber. A drain pan is disposed in a lower portion of the heat exchange chamber to receive and drain away condensed water generated in the heat exchanger. The drain pan extends from the lower portion of the heat exchange chamber toward a lower portion of the machine chamber. A sensor for detecting flammable refrigerant is disposed in a lower portion of the machine chamber near the drain pan. If flammable refrigerant leaks out of the heat exchanger, the flammable refrigerant flows on and along the drain pan to a lower portion of the machine chamber, and is detected by the sensor. In response to the detection of leakage of the flammable refrigerant, an air-sending device of the indoor unit is activated.

CITATION LIST

Patent Literature

Patent Literature 1: Japanese Unexamined Patent Application Publication No. 2002-98346

SUMMARY OF INVENTION

Technical Problem

Unfortunately, gas sensors used to detect refrigerant leakage often falsely detect foreign gas (gas other than refrigerant gas) such as propane or insecticide sucked into the indoor unit from outside of the indoor unit.

The present invention has been made in view of the above-mentioned problem, and an object thereof is to provide an air-conditioning apparatus that makes it possible to prevent false detection of foreign gas other than refrigerant.

Solution to Problem

An air-conditioning apparatus according to an embodiment of the present invention includes a refrigerant circuit in which refrigerant is circulated, and an indoor unit configured to accommodate a load-side heat exchanger of the refrigerant circuit. The indoor unit includes an air outlet provided in the housing, an air inlet provided in the housing below the air outlet, an air passage that extends between the air inlet and the air outlet via the load-side heat exchanger, a refrigerant detection unit disposed below the air inlet, and a first partition plate configured to separate the air passage from a space in which the refrigerant detection unit is installed.

Advantageous Effects of Invention

According to an embodiment of the present invention, the presence of the first partition plate ensures that foreign gas sucked in through the air inlet does not enter the space where the refrigerant detection unit is installed. This makes it possible to prevent false detection of the foreign gas by the refrigerant detection unit.

DESCRIPTION OF EMBODIMENTS

Embodiment 1

Figure 1:
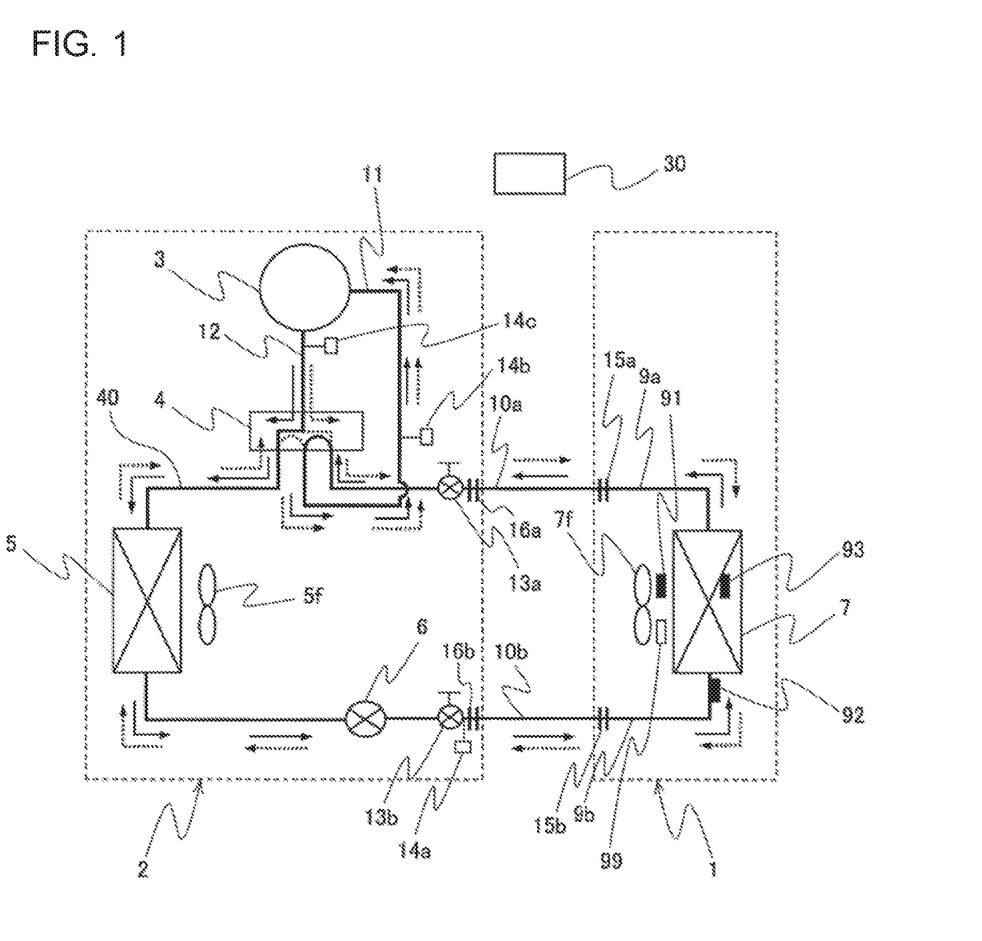
FIG. 1 is a refrigerant circuit diagram illustrating the schematic configuration of an air-conditioning apparatus according to Embodiment 1 of the present invention.

An air-conditioning apparatus according to Embodiment 1 of the present invention will be described below. FIG. 1 is a refrigerant circuit diagram illustrating the general configuration of an air-conditioning apparatus according to Embodiment 1. In the drawings described above including FIG. 1, the relative sizes of components and their shapes may often differ from the actual ones.

As illustrated in FIG. 1, the air-conditioning apparatus includes a refrigerant circuit 40 in which refrigerant is circulated. The refrigerant circuit 40 includes the following components sequentially connected in a loop by refrigerant pipes: a compressor 3, a refrigerant flow switching device 4, a heat source-side heat exchanger 5 (e.g. an outdoor heat exchanger), a pressure reducing device 6, and a load-side heat exchanger 7 (e.g. an indoor heat exchanger). The air-conditioning apparatus includes, as a heat source unit, an outdoor unit 2 that is installed outdoors, for example. Further, the air-conditioning apparatus includes, as a load unit, an indoor unit 1 that is installed indoors, for example. The indoor unit 1 and the outdoor unit 2 are connected to each other by an extension pipe 10a (gas pipe) and an extension pipe 10b (liquid pipe), which each constitute a portion of a refrigerant pipe.

Examples of refrigerants circulated in the refrigerant circuit 40 include a mildly flammable refrigerant such as HFO-1234yf or HFO-1234ze, and a highly flammable refrigerant such as R290 or R1270. Each of these refrigerants may be used as a single-component refrigerant, or may be used as a mixture of two or more types of refrigerant. Hereinafter, a refrigerant with a level of flammability equal to or higher than mild flammability (e.g. 2 L or higher in accordance with the ASHRAE-34 classification) will be often referred to as "flammable refrigerant". Alternatively, a non-flammable refrigerant with no flammability (e.g. "1" in accordance with the ASHRAE-34 classification), such as R22 or R410A, may be used as the refrigerant to be circulated in the refrigerant circuit 40. The above-mentioned refrigerants have, for example, densities greater than the density of air under atmospheric pressure.

The compressor 3 is a piece of fluid machinery that compresses a low-pressure refrigerant sucked into the compressor 3, and discharges the compressed refrigerant as a high-pressure refrigerant. The refrigerant flow switching device 4 switches the directions of refrigerant flow within the refrigerant circuit 40 between cooling operation and heating operation. As an example of the refrigerant flow switching device 4, a four-way valve is used. The heat source-side heat exchanger 5 acts as a radiator (e.g. a condenser) in cooling operation, and acts as an evaporator in heating operation. The heat source-side heat exchanger 5 exchanges heat between the refrigerant flowing in the heat source-side heat exchanger 5 and the outdoor air being supplied by an outdoor fan 5f described later. The pressure reducing device 6 causes a high-pressure refrigerant to be reduced in pressure and change to a low-pressure refrigerant. As an example of the pressure reducing device 6, an electronic expansion valve with an adjustable opening degree is used. The load-side heat exchanger 7 acts as an evaporator in cooling operation, and acts as a radiator (e.g. a condenser) in heating operation. The load-side heat exchanger 7 exchanges heat between the refrigerant flowing in the load-side heat exchanger 7 and the air being supplied by an indoor fan 7f described later. In this regard, cooling operation refers to an operation in which a low-temperature, low-pressure refrigerant is supplied to the load-side heat exchanger 7, and heating operation refers to an operation in which a high-temperature, high-pressure refrigerant is supplied to the load-side heat exchanger 7.

The outdoor unit 2 accommodates the compressor 3, the refrigerant flow switching device 4, the heat source-side heat exchanger 5, and the pressure reducing device 6. The outdoor unit 2 also accommodates the outdoor fan 5f that supplies outdoor air to the heat source-side heat exchanger 5. The outdoor fan 5f is installed so as to face the heat source-side heat exchanger 5. Rotating the outdoor fan 5f creates a flow of air that passes through the heat source-side heat exchanger 5. As the outdoor fan 5f, a propeller fan is used, for example. The outdoor fan 5f is disposed, for example, downstream of the heat source-side heat exchanger 5 relative to the flow of air created by the outdoor fan 5f.

Refrigerant pipes disposed in the outdoor unit 2 include a refrigerant pipe connecting an extension-pipe connection valve 13a with the refrigerant flow switching device 4 and serving as a gas-side refrigerant pipe during cooling operation, a suction pipe 11 connected to the suction side of the compressor 3, a discharge pipe 12 connected to the discharge side of the compressor 3, a refrigerant pipe connecting the refrigerant flow switching device 4 with the heat source-side heat exchanger 5, a refrigerant pipe connecting the heat source-side heat exchanger 5 with the pressure reducing device 6, and a refrigerant pipe connecting an extension-pipe connection valve 13b with the pressure reducing device 6 and serving as a liquid-side refrigerant pipe during cooling operation. The extension-pipe connection valve 13a is implemented as a two-way valve capable of being switched open and close. A fitting 16a (e.g. a flare fitting) is attached to one end of the extension-pipe connection valve 13a. The extension-pipe connection valve 13b is implemented as a three-way valve capable of being switched open and close. A service port 14a, which is used during vacuuming performed prior to filling the refrigerant circuit 40 with refrigerant, is attached to one end of the extension-pipe connection valve 13b. A fitting 16b (e.g. a flare fitting) is attached to the other end of the extension-pipe connection valve 13b.

A high-temperature, high-pressure gas refrigerant compressed by the compressor 3 flows through the discharge pipe 12 in both cooling operation and heating operation. A low-temperature, low-pressure gas refrigerant or two-phase refrigerant that underwent evaporation flows through the suction pipe 11 in both cooling operation and heating operation. A service port 14b with flare fitting, which is located on the low-pressure side, is connected to the suction pipe 11. A service port 14c with flare fitting, which is located on the high-pressure side, is connected to the discharge pipe 12. The service ports 14b and 14c are each used to connect a pressure gauge to measure operating pressure during a test run conducted at the time of installation or repair of the air-conditioning apparatus.

The indoor unit 1 accommodates the load-side heat exchanger 7. The indoor unit 1 also accommodates the indoor fan 7f that supplies air to the load-side heat exchanger 7. Rotating the indoor fan 7f creates a flow of air that passes through the load-side heat exchanger 7. Depending on the type of the indoor unit 1 used, the indoor fan 7f to be used is, for example, a centrifugal fan (e.g. a sirocco fan or a turbo fan), a cross-flow fan, a mixed flow fan, or an axial fan (e.g. a propeller fan). Although the indoor fan 7f in the present example is disposed upstream of the load-side heat exchanger 7 relative to the flow of air created by the indoor fan 7f, the indoor fan 7f may be disposed downstream of the load-side heat exchanger 7.

Among refrigerant pipes in the indoor unit 1, an indoor pipe 9a on the gas side is provided with a fitting 15a (e.g. a flare fitting), which is located at the connection with the extension pipe 10a on the gas side to connect the extension pipe 10a. Further, among refrigerant pipes in the indoor unit 1, an indoor pipe 9b on the liquid side is provided with a fitting 15b (e.g. a flare fitting), which is located at the connection with the extension pipe 10b on the liquid side to connect the extension pipe 10b.

The indoor unit 1 is provided with components such as a suction air temperature sensor 91 that detects the temperature of indoor air sucked in from the indoor space, a heat exchanger liquid pipe temperature sensor 92 that detects the temperature of liquid refrigerant at the location of the load-side heat exchanger 7 that serves as the inlet during cooling operation (the outlet during heating operation), and a heat exchanger two-phase pipe temperature sensor 93 that detects the temperature (evaporating temperature or condensing temperature) of two-phase refrigerant in the load-side heat exchanger 7. The suction air temperature sensor 91, the heat exchanger liquid pipe temperature sensor 92, and the heat exchanger two-phase pipe temperature sensor 93 each output a detection signal to a controller 30 that controls the indoor unit 1 or the entire air-conditioning apparatus.

The controller 30 has a microcomputer including components such as a CPU, a ROM, a RAM, an I/O port, and a timer. The controller 30 is capable of communicating data with an operating unit 26 (see FIG. 2). The operating unit 26 receives an operation conducted by the user, and outputs an operational signal based on the operation to the controller 30. The controller 30 in the present example controls the operation of the indoor unit 1 or the entire air-conditioning apparatus, including operation of the indoor fan 7f, based on information such as an operational signal from the operating unit 26 or detection signals from various sensors. The controller 30 may be disposed inside the housing of the indoor unit 1, or may be disposed inside the housing of the outdoor unit 2. The controller 30 may include an outdoor-unit controller disposed in the outdoor unit 2, and an indoor-unit controller disposed in the indoor unit 1 and capable of communicating data with the outdoor-unit controller.

Next, operation of the refrigerant circuit 40 of the air-conditioning apparatus will be described. First, cooling operation will be described. In FIG. 1, solid arrows indicate the flow of refrigerant in cooling operation. The refrigerant circuit 40 is configured such that, in cooling operation, the flows of refrigerant are switched by the refrigerant flow switching device 4 as indicated by the solid lines to direct a low-temperature, low-pressure refrigerant into the load-side heat exchanger 7.

A high-temperature, high-pressure gas refrigerant discharged from the compressor 3 first flows into the heat source-side heat exchanger 5 via the refrigerant flow switching device 4. In cooling operation, the heat source-side heat exchanger 5 acts as a condenser. That is, the heat source-side heat exchanger 5 exchanges heat between the refrigerant flowing in the heat source-side heat exchanger 5, and the outdoor air being supplied by the outdoor fan 5f, and the condensation heat of the refrigerant is rejected to the outdoor air. This causes the refrigerant entering the heat source-side heat exchanger 5 to condense into a high-pressure liquid refrigerant. The high-pressure liquid refrigerant flows into the pressure reducing device 6 where the refrigerant is reduced in pressure and changes to a low-pressure, two-phase refrigerant. The low-pressure, two-phase refrigerant flows into the load-side heat exchanger 7 of the indoor unit 1 via the extension pipe 10b. In cooling operation, the load-side heat exchanger 7 acts as an evaporator. That is, the load-side heat exchanger 7 exchanges heat between the refrigerant flowing in the load-side heat exchanger 7 and the air (e.g. indoor air) being supplied by the indoor fan 7f, and the evaporation heat of the refrigerant is received from the air. This causes the refrigerant entering the load-side heat exchanger 7 to evaporate into a low-pressure gas refrigerant or two-phase refrigerant. The air supplied by the indoor fan 7f is cooled as the refrigerant receives heat from the air. The low-pressure gas refrigerant or two-phase refrigerant evaporated in the load-side heat exchanger 7 is sucked into the compressor 3 via the extension pipe 10a and the refrigerant flow switching device 4. The refrigerant sucked into the compressor 3 is compressed into a high-temperature, high-pressure gas refrigerant. The above cycle is repeated in cooling operation.

Next, heating operation will be described. In FIG. 1, dotted arrows indicate the flow of refrigerant in heating operation. The refrigerant circuit 40 is configured such that, in heating operation, the flows of refrigerant are switched by the refrigerant flow switching device 4 as indicated by the dotted lines to direct a high-temperature, high-pressure refrigerant into the load-side heat exchanger 7. In heating operation, refrigerant flows in a direction opposite to the direction in which refrigerant flows in cooling operation, with the load-side heat exchanger 7 acting as a condenser. That is, the load-side heat exchanger 7 exchanges heat between the refrigerant flowing in the load-side heat exchanger 7, and the air being supplied by the indoor fan 7f and the condensation heat of the refrigerant is rejected to the air. The air supplied by the indoor fan 7f is thus heated as the refrigerant rejects heat to the air.

Figure 2:
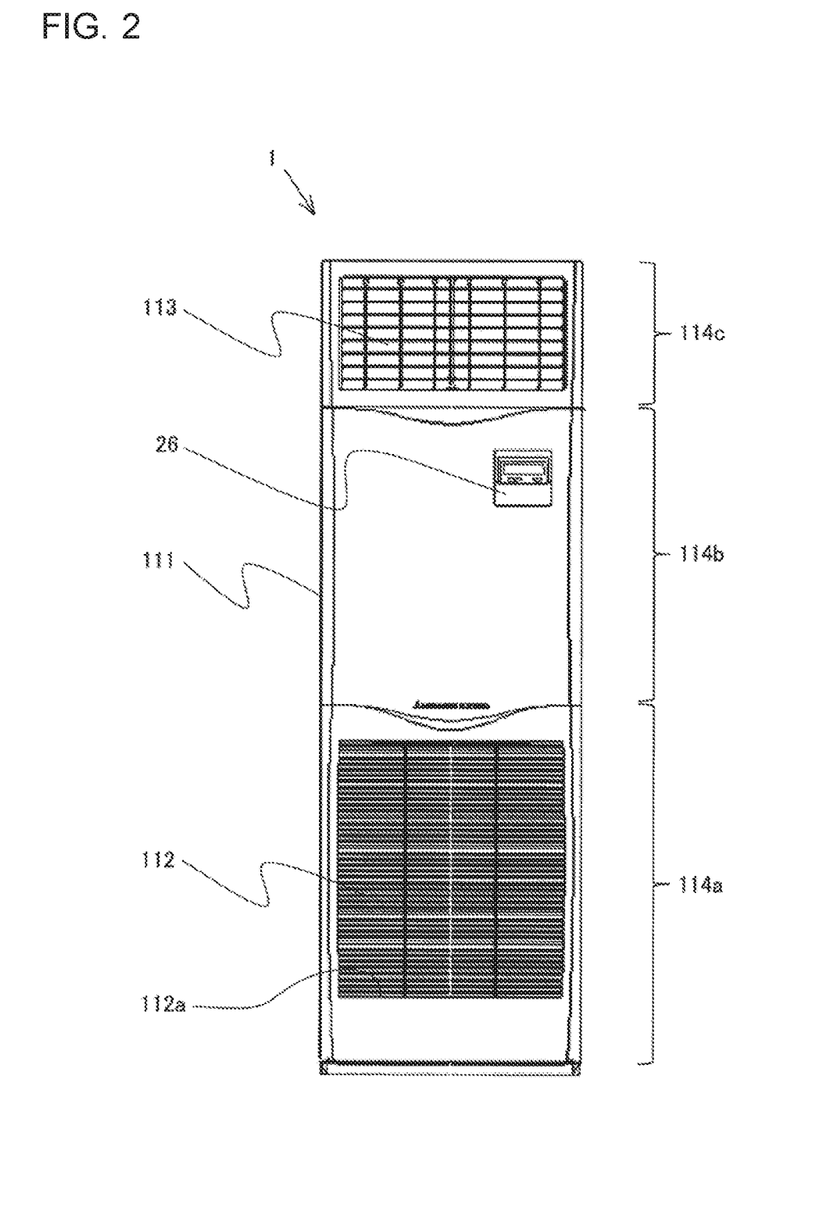
FIG. 2 is a front view of an indoor unit 1 of the air-conditioning apparatus according to Embodiment 1 of the present invention, illustrating the outward appearance of the indoor unit 1.
Figure 3:
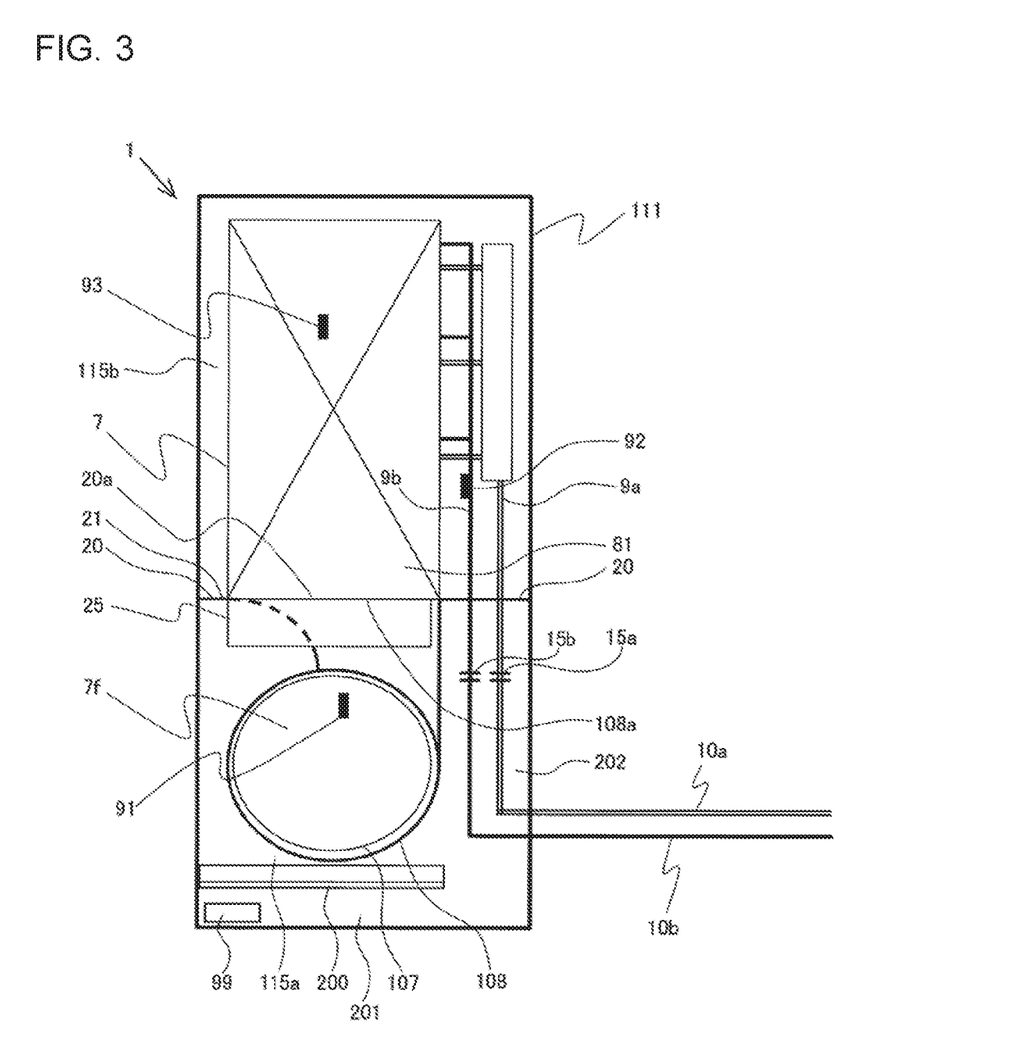
FIG. 3 is a front view of the indoor unit 1 of the air-conditioning apparatus according to Embodiment 1 of the present invention, schematically illustrating the internal structure of the indoor unit 1.
Figure 4:
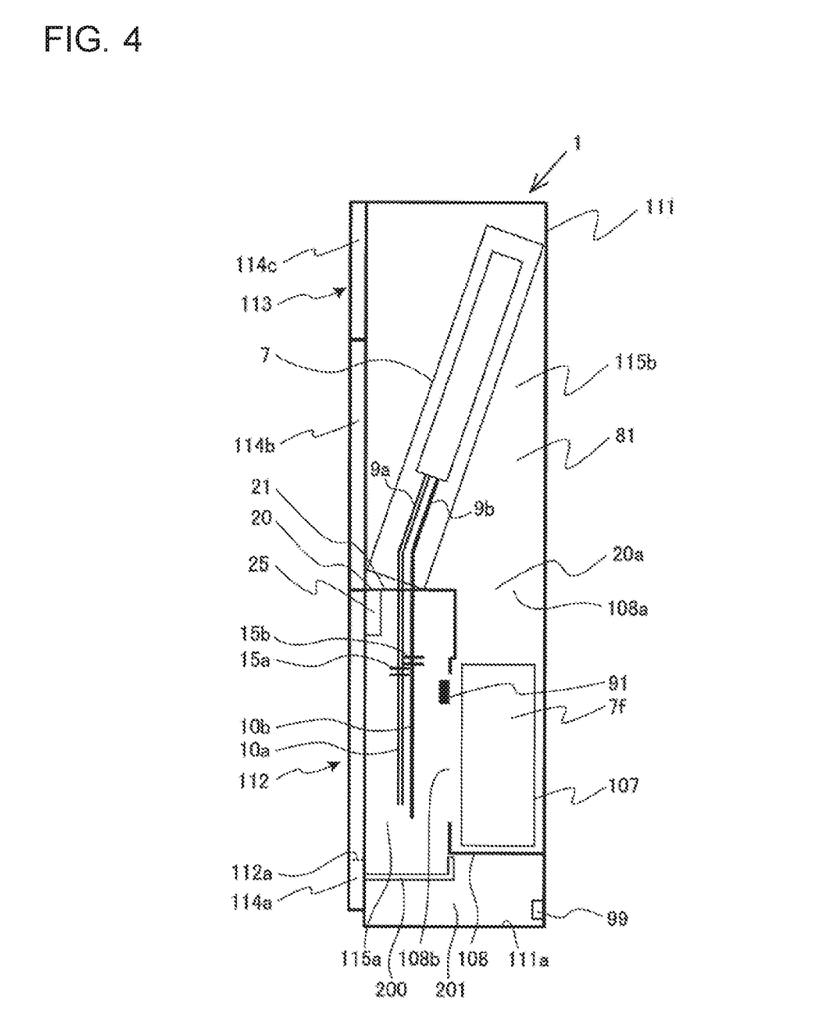
FIG. 4 is a side view of the indoor unit 1 of the air-conditioning apparatus according to Embodiment 1 of the present invention, schematically illustrating the internal structure of the indoor unit 1.

FIG. 2 is a front view of the indoor unit 1 of the air-conditioning apparatus according to Embodiment 1, illustrating the external appearance of the indoor unit 1. FIG. 3 is a front view of the indoor unit 1 of the air-conditioning apparatus according to Embodiment 1, schematically illustrating the internal structure of the indoor unit 1. FIG. 4 is a side view of the indoor unit 1 of the air-conditioning apparatus according to Embodiment 1, schematically illustrating the internal structure of the indoor unit 1. The left-hand side in FIG. 4 represents the front side (closer to the indoor space) of the indoor unit 1. Embodiment 1 uses, as an example of the indoor unit 1, the indoor unit 1 of a floor-standing type installed on the floor surface of the indoor space that is the space to be air-conditioned. In general, the positional relationship of components (e.g. their vertical positional relationship) in the following description will be based on those when the indoor unit 1 is installed in a ready-to-use state.

As illustrated in FIGS. 2 to 4, the indoor unit 1 includes a housing 111 having the shape of a vertically elongated cuboid. An air inlet 112 for sucking indoor air is located in a lower portion of the front face of the housing 111. The air inlet 112 in the present example is disposed below the vertically central portion of the housing 111 and near the floor surface. An air outlet 113 for blowing out the air sucked in through the air inlet 112 is located in an upper portion of the front face of the housing 111, that is, at a position higher than the air inlet 112 (e.g. above the vertically central portion of the housing 111). An air passage 81 is provided inside the housing 111 to allow air to flow from the air inlet 112 toward the air outlet 113. The load-side heat exchanger 7 is disposed in the air passage 81.

The operating unit 26 is disposed at a position on the front face of the housing 111 above the air inlet 112 and below the air outlet 113. The operating unit 26 is connected to the controller 30 via a communication line. The operating unit 26 and the controller 30 are thus capable of communicating data with each other. The operating unit 26 is operated by the user to perform operations such as starting and ending the operation of the air-conditioning apparatus, switching of operation modes, and setting of a present temperature and a preset air volume. The operating unit 26 may be provided with a component serving as an informing unit to provide information to the user, such as a display or an audio output unit.

The housing 111 is in the form of a hollow box. The front face of the housing 111 has a front opening. The housing 111 includes a first front panel 114a, a second front panel 114b, and a third front panel 114c, which are each attached to the front opening so as to be detachable. Each of the first front panel 114a, the second front panel 114b, and the third front panel 114c has a substantially rectangular, flat outer shape. The first front panel 114a is attached to a lower portion of the front opening of the housing 111 so as to be detachable. The first front panel 114a is provided with the air inlet 112. The second front panel 114b is disposed above and closer to the first front panel 114a, and attached to the vertically central portion of the front opening of the housing 111 so as to be detachable. The second front panel 114b is provided with the operating unit 26. The third front panel 114c is disposed above and closer to the second front panel 114b, and attached to an upper portion of the front opening of the housing 111 so as to be detachable. The third front panel 114c is provided with the air outlet 113.

The internal space of the housing 111 is roughly divided into a lower space 115a serving as an air-sending portion, and an upper space 115b located above the lower space 115a and serving as a heat exchange portion. The lower space 115a and the upper space 115b are separated from each other by a partition unit 20. The partition unit 20 has the shape of, for example, a flat plate, and is oriented substantially horizontally. The partition unit 20 is provided with at least an air passage opening 20a, which serves as an air passage between the lower space 115a and the upper space 115b. The lower space 115a is exposed to the front side when the first front panel 114a is detached from the housing 111. The upper space 115b is exposed to the front side when the second front panel 114b and the third front panel 114c are detached from the housing 111. That is, the partition unit 20 is placed at substantially the same height as the upper end of the first front panel 114a or the lower end of the second front panel 114b. The partition unit 20 may be formed integrally with a fan casing 108 described later, may be formed integrally with a drain pan 21 described later, or may be formed as a component separate from the fan casing 108 and the drain pan 21.

The indoor fan 7f is disposed in the lower space 115a to create, in the air passage 81 within the housing 111, a flow of air that travels toward the air outlet 113 from the air inlet 112. The indoor fan 7f in the present example is a sirocco fan including a motor (not illustrated), and an impeller 107 connected to the output shaft of the motor and having a plurality of blades arranged circumferentially at equal intervals, for example. The impeller 107 is disposed such that its rotational axis is substantially parallel to the direction of the depth of the housing 111. The motor used for the indoor fan 7f is a non-brush type motor (e.g. an induction motor or a DC brushless motor). This ensures that sparking does not occur when the indoor fan 7f rotates.

The impeller 107 of the indoor fan 7f is accommodated in the fan casing 108 having a spiral shape. The fan casing 108 is formed as a component separate from the housing 111, for example. An air inlet opening 108b for sucking the indoor air into the fan casing 108 via the air inlet 112 is located in the vicinity of the center of the spiral of the fan casing 108. The air inlet opening 108b is positioned so as to face the air inlet 112 with a predetermined space therebetween. Further, an air outlet opening 108a for blowing out the air to be sent is located in the direction of the tangent to the spiral of the fan casing 108. The air outlet opening 108a is directed upward, and connected to the upper space 115b via the air passage opening 20a of the partition unit 20. In other words, the air outlet opening 108a communicates with the upper space 115b via the air passage opening 20a. The open end of the air outlet opening 108a and the open end of the air passage opening 20a may be directly connected with each other, or may be indirectly connected with each other via a component such as a duct element.

For example, a microcomputer constituting the controller 30, and an electrical component box 25 configured to accommodate components such as various electrical components and a board are disposed in the lower space 115a.

The upper space 115b is located downstream of the lower space 115a relative to the flow of air created by the indoor fan 7f. The load-side heat exchanger 7 is disposed in the air passage 81 within the upper space 115b. The drain pan 21 is disposed below the load-side heat exchanger 7 to receive condensed water condensed on the surface of the load-side heat exchanger 7. The drain pan 21 may be formed as a portion of the partition unit 20, or may be formed as a component separate from the partition unit 20 and disposed over the partition unit 20.

The indoor pipes 9a and 9b connected to the load-side heat exchanger 7 penetrate the partition unit 20 and are extended downward from the upper space 115b to the lower space 115a. The indoor pipe 9a is connected to the extension pipe 10a via the fitting 15a. The indoor pipe 9b is connected to the extension pipe 10b via the fitting 15b. The fittings 15a and 15b are disposed in the lower space 115a. Refrigerant pipes such as the indoor pipes 9a and 9b, the extension pipes 10a and 10b, and the fittings 15a and 15b are disposed inside the housing 111 of the indoor unit 1 beside (on the right-hand side in the front view of FIG. 3) the air passage 81. That is, within the housing 111, an installation space 202 in which these refrigerant pipes are installed, and the air passage 81 are arranged in parallel to each other in substantially the lateral direction.

A refrigerant detection unit 99 is disposed below the air inlet 112 and the air passage 81 (e.g. near the bottom portion of the lower space 115a) to detect leakage of refrigerant. The refrigerant detection unit 99 is configured to, for example, detect the concentration of refrigerant in the air around the refrigerant detection unit 99, and output a detection signal to the controller 30. Based on the detection signal from the refrigerant detection unit 99, the controller 30 determines whether a refrigerant leak is present. As the refrigerant detection unit 99, for example, a semiconductor gas sensor or a hot-wire semiconductor gas sensor may be used.

With respect to the lateral direction of the indoor unit 1, the refrigerant detection unit 99 is located opposite (on the left-hand side in the front view of FIG. 3) to the area where refrigerant pipes such as the indoor pipes 9a and 9b, the extension pipes 10a and 10b, and the fittings 15a and 15b are placed. This ensures easy handling of the extension pipes 10a and 10b. The fittings 15a and 15b, and the pipes around the fittings 15a and 15b are covered by a heat insulation material after the indoor pipes 9a and 9b and the extension pipes 10a and 10b are connected by the installation contractor who installs the indoor unit 1. At this time, depending on the operating accuracy with which the heat insulation material is attached by the installation contractor, a gap may be formed in the heat insulation material, causing formation of condensation on the fittings 15a and 15b and on the pipes around the fittings 15a and 15b. Positioning the refrigerant detection unit 99 as described above ensures that water does not drip to the refrigerant detection unit 99 even when condensation forms on the fittings 15a and 15b and on the pipes around the fittings 15a and 15b.

The refrigerant detection unit 99 is disposed, for example, at a position below refrigerant pipes such as the indoor pipes 9a and 9b, the extension pipes 10a and 10b, and the fittings 15a and 15b. In the indoor unit 1, it is highly possible that refrigerant leaks occur in these refrigerant pipes. Accordingly, for cases where a refrigerant having a density greater than air under atmospheric pressure is used, disposing the refrigerant detection unit 99 at a position below refrigerant pipes such as the indoor pipes 9a and 9b, the extension pipes 10a and 10b, and the fittings 15a and 15b allows for more reliable detection of refrigerant leakage. In Embodiment 1, the refrigerant detection unit 99 is disposed in the lower space 115a within a height range equal to or lower than the height of a lower opening end 112a of the air inlet 112 and equal to or higher than the height of a bottom portion 111a of the housing 111 (see FIG. 4). At the bottom of the lower space 115a, a small-volume recess that opens upward is provided within the above-mentioned height range. If a refrigerant having a density greater than air under atmospheric pressure is used, a very small portion of leaked refrigerant stagnates in the recess without escaping out of the housing 111. Therefore, disposing the refrigerant detection unit 99 inside the recess ensures that refrigerant leakage can be detected with enhanced reliability. Since only a very small amount of refrigerant stagnates in the recess, and no ignition source is present in the recess, there is no potential risk of ignition.

Inside the housing 111, the air passage 81 and an installation space 201 for the refrigerant detection unit 99 are adjacent to each other in a substantially vertical direction. The air passage 81, and the installation space 201 for the refrigerant detection unit 99 are separated from each other by a first partition plate 200. The first partition plate 200 in the present example separates the following two spaces from each other a space within the air passage 81 located between the air inlet 112 and the fan casing 108; and the installation space 201 for the refrigerant detection unit 99 (see FIG. 4). The first partition plate 200 is formed of a sheet metal element bent in an L-shape in cross-section. At least a portion of the first partition plate 200 is placed substantially horizontally, at a height equal to or lower than the height of the lower opening end 112*a* of the air inlet 112. Desirably, the first partition plate 200 is shaped to have a flow-rectifying effect to prevent, for example, separation of airflow in the air passage 81 or generation of a vortex in airflow. From the viewpoint of reducing pressure loss in the air passage 81, the first partition plate 200 is desirably installed such that the number of bends in the air passage 8 is minimized.

In Embodiment 1, the first partition plate 200 does not extend to the installation space 202 in which refrigerant pipes such as the indoor pipes 9*a* and 9*b*, the extension pipes 10*a* and 10*b*, and the fittings 15*a* and 15*b* are installed (see FIG. 3). That is, the first partition plate 200 is not provided directly below refrigerant pipes such as the indoor pipes 9*a* and 9*b*, the extension pipes 10*a* and 10*b*, and the fittings 15*a* and 15*b*. Consequently, when refrigerant leaks out of these refrigerant pipes, the leaked refrigerant flows down to the installation space 201 for the refrigerant detection unit 99 without being obstructed by the first partition plate 200. This allows for more reliable detection of refrigerant leakage by the refrigerant detection unit 99. It is highly possible that refrigerant leaks occur easily in the fittings 15*a* and 15*b* in these refrigerant pipes. For this reason, it is desirable that the first partition plate 200 be not disposed at least directly below the fittings 15*a* and 15*b*. This configuration makes it possible to provide a path along which leaked refrigerant travels from a leak site to the installation space 201 for the refrigerant detection unit 99, while allowing the air passage 81 and the installation space 201 for the refrigerant detection unit 99 to be separated from each other by the first partition plate 200.

Next, operation of the indoor unit 1 will be described. Upon driving the indoor fan 7*f*, indoor air is sucked in through the air inlet 112. The sucked indoor air passes through the load-side heat exchanger 7 disposed in the air passage 81, and turns into conditioned air, which is then blown indoors from the air outlet 113.

When the indoor fan 7*f* is in operation, even if refrigerant leaks out of the indoor unit 1, the leaked refrigerant is blown out from the air outlet 113 together with air, thus allowing dispersion of the leaked refrigerant in the indoor space. This helps prevent localized increases in indoor refrigerant concentration. This ensures that formation of flammable concentration regions in the indoor space is prevented even if a flammable refrigerant is used.

It is to be noted, however, that when the indoor fan 7*f* is in operation, in particular, foreign gas (gas other than refrigerant gas) such as propane or insecticide may be sucked in through the air inlet 112 together with indoor air in some cases. If this foreign gas enters the installation space 201 for the refrigerant detection unit 99, this can cause false detection of the foreign gas by the refrigerant detection unit 99, with the result that refrigerant leakage is determined to be occurring even through no such refrigerant leakage is actually occurring.

In this regard, the air passage 81 and the installation space 201 for the refrigerant detection unit 99 are separated from each other by the first partition plate 200 in Embodiment 1. This configuration ensures that foreign gas sucked in through the air inlet 112 does not enter the installation space 201 for the refrigerant detection unit 99. This makes it possible to prevent false detection of the foreign gas by the refrigerant detection unit 99.

By contrast, when the indoor fan 7*f* is in stopped condition, if refrigerant leaks out of the indoor unit 1, the leaked refrigerant accumulates in a lower area within the housing 111 or near the floor in the indoor space. This may lead to localized increases in indoor refrigerant concentration. For this reason, reliable detection of refrigerant leakage is required especially when the indoor fan 7*f* is in stopped condition.

In Embodiment 1, if refrigerant leakage occurs in refrigerant pipes such as the indoor pipes 9*a* and 9*b*, the extension pipes 10*a* and 10*b*, and the fittings 15*a* and 15*b*, the leaked refrigerant flows down to the installation space 201 for the refrigerant detection unit 99 without being obstructed by the first partition plate 200. This allows for more reliable detection of refrigerant leakage by the refrigerant detection unit 99. For example, the controller 30 starts the operation of the indoor fan 7*f* upon detecting refrigerant leakage based on a detection signal from the refrigerant detection unit 99. Consequently, the leaked refrigerant can be dispersed, thus minimizing localized increases in indoor refrigerant concentration. This makes it possible to prevent formation of flammable concentration regions in the indoor space even if a flammable refrigerant is used. Alternatively or additionally, the controller 30 may, in response to detection of refrigerant leakage, inform the user that refrigerant is leaking, by means of a display, an audio output unit, or other such components provided to the operating unit 26. Further, the controller 30 may, in response to detection of refrigerant leakage, forcibly deactivate the compressor 3 or disable activation of the compressor 3.

As described above, the air-conditioning apparatus according to Embodiment 1 includes the refrigerant circuit 40 in which refrigerant is circulated, and the indoor unit 1 configured to accommodate the load-side heat exchanger 7 of the refrigerant circuit 40. The indoor unit 1 includes the air outlet 113 provided in the housing 111, the air inlet 112 provided in the housing 111 below the air outlet 113, the air passage 81 that extends between the air inlet 112 and the air outlet 113 via the load-side heat exchanger 7, the refrigerant detection unit 99 disposed below the air inlet 112, and the first partition plate 200 that separates the air passage 81 from the installation space 201 for the refrigerant detection unit 99.

Due to this configuration, the presence of the first partition plate 200 prevents foreign gas sucked in through the air inlet 112 from flowing into the installation space 201 for the refrigerant detection unit 99. This makes it possible to prevent false detection of foreign gas other than refrigerant by the refrigerant detection unit 99.

With the air-conditioning apparatus according to Embodiment 1, the indoor unit 1 further includes the fan casing 108 configured to accommodate the indoor fan 7f. The air inlet opening 108b of the fan casing 108 is positioned so as to face the air inlet 112. The first partition plate 200 separates a space within the air passage 81 between the air inlet 112 and the fan casing 108 from the installation space 201 for the refrigerant detection unit 99.

Foreign gas sucked in through the air inlet 112 tends to flow into the installation space 201 for the refrigerant detection unit 99 from the space between the air inlet 112 and the fan casing 108. According to the above-mentioned configuration, the space between the air inlet 112 and the fan casing 108 and the installation space 201 for the refrigerant detection unit 99 are separated from each other by the first partition plate 200, thus preventing entry of foreign gas into the installation space 201 for the refrigerant detection unit 99 more reliably. This makes it possible to prevent false detection of foreign gas other than refrigerant by the refrigerant detection unit 99.

With the air-conditioning apparatus according to Embodiment 1, a refrigerant pipe (e.g. the indoor pipe 9a or 9b, the extension pipe 10a or 10b, or the fitting 15a or 15b) connected to the load-side heat exchanger 7 is disposed inside the housing 111 beside the air passage 81. The first partition plate 200 is not provided directly below the refrigerant pipe.

Due to the above-mentioned configuration, if refrigerant leaks out of such a refrigerant pipe, the leaked refrigerant flows down to the installation space 201 for the refrigerant detection unit 99 without being obstructed by the first partition plate 200. This allows for more reliable detection of refrigerant leakage by the refrigerant detection unit 99.

Embodiment 2

Figure 5:
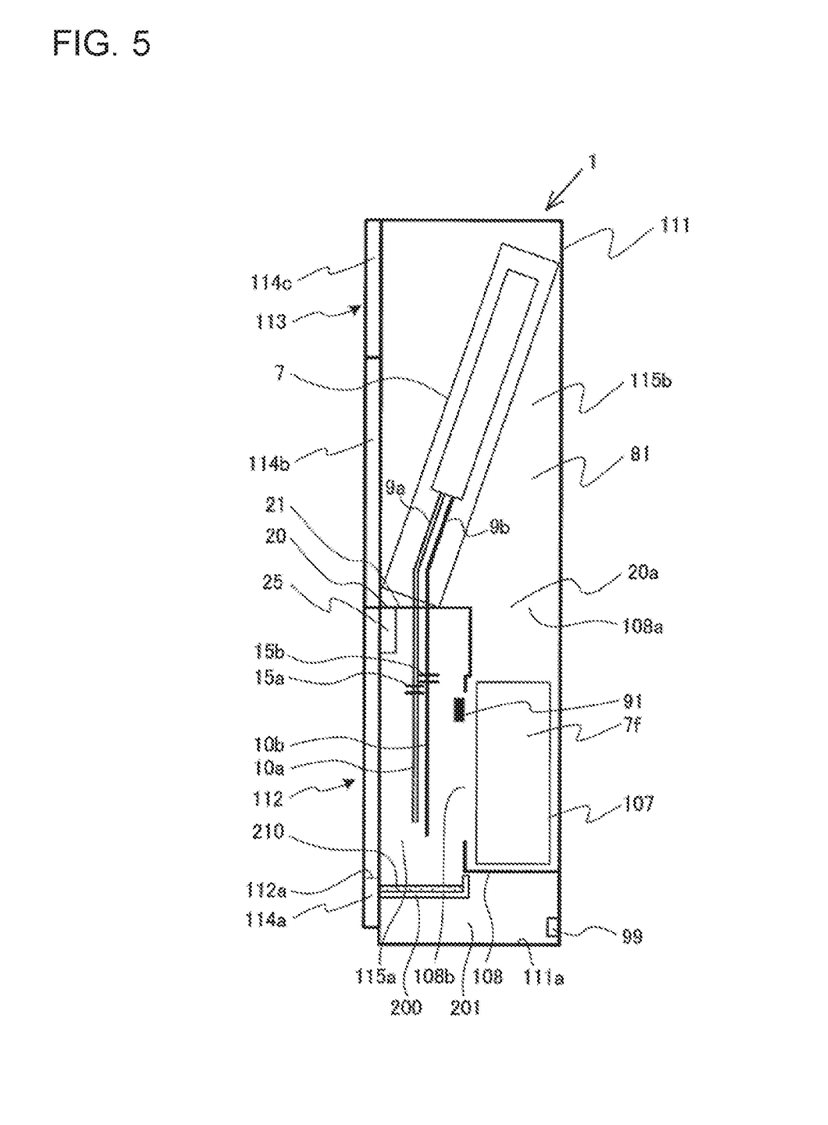
FIG. 5 is a side view of the indoor unit 1 of an air-conditioning apparatus according to Embodiment 2 of the present invention, schematically illustrating the internal structure of the indoor unit 1.

An air-conditioning apparatus according to Embodiment 2 of the present invention will be described below. FIG. 5 is a side view of the indoor unit 1 of the air-conditioning apparatus according to Embodiment 2, schematically illustrating the internal structure of the indoor unit 1. As illustrated in FIG. 5, in Embodiment 2, a particulate adsorbing element 210 for adsorbing foreign gas is disposed on a surface of the first partition plate 200 located closer to the air passage 81. The particulate adsorbing element 210 is made of, for example, a porous material such as activated carbon or silica gel. Due to the presence of the particulate adsorbing element 210 on the surface of the first partition plate 200 located adjacent to the air passage 81, foreign gas sucked in through the air inlet 112 is adsorbed by the particulate adsorbing element 210 before flowing into the installation space 201 for the refrigerant detection unit 99. This means that the foreign gas hardly reaches the installation space 201 for the refrigerant detection unit 99, thus further reducing the risk of the foreign gas being falsely detected by the refrigerant detection unit 99.

In some cases, the particulate adsorbing element 210 may adsorb not only foreign gas but also refrigerant gas. The presence of the particulate adsorbing element 210, however, does not affect the accuracy of refrigerant leakage detection. The reason therefor is as follows.

If R32 is used as refrigerant, the refrigerant concentration threshold used in determining whether a refrigerant leak is present is, for example, about 3.6 wt %, which is equivalent to ¼ of the LFL (14.4 vol %) for R32, that is, in the order of several percent. By contrast, the concentration of foreign gas (e.g. butane or propane) is typically in the order of about 100 to 1000 ppm (0.01 to 0.1%), which is lower by one or more digits than the refrigerant concentration threshold. Therefore, even if foreign gas and refrigerant gas are adsorbed by the particulate adsorbing element 210 at such an adsorption rate that prevents false detection of foreign gas, this does not affect the accuracy of refrigerant leakage detection.

As described above, with the air-conditioning apparatus according to Embodiment 2, the particulate adsorbing element 210 is disposed on a surface of the first partition plate 200 located closer to the air passage 81.

Due to the above-mentioned configuration, foreign gas sucked in through the air inlet 112 is adsorbed by the particulate adsorbing element 210 before flowing into the installation space 201 for the refrigerant detection unit 99. This helps further reduction of the risk of false detection of foreign gas by the refrigerant detection unit 99.

Embodiment 3

Figure 6:
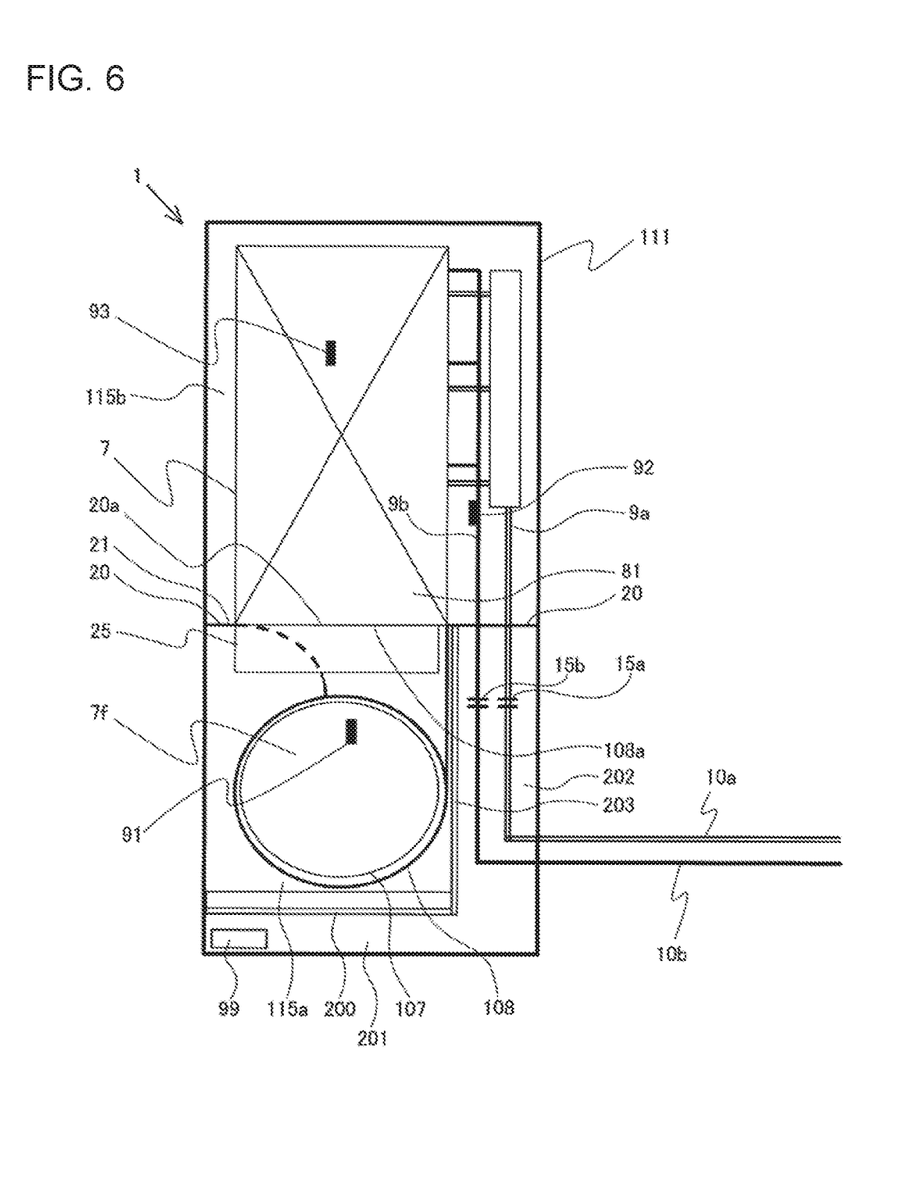
FIG. 6 is a front view of the indoor unit 1 of an air-conditioning apparatus according to Embodiment 3 of the present invention, schematically illustrating the internal structure of the indoor unit 1.

An air-conditioning apparatus according to Embodiment 3 of the present invention will be described below. FIG. 6 is a front view of the indoor unit 1 of the air-conditioning apparatus according to Embodiment 3, schematically illustrating the internal structure of the indoor unit 1. As illustrated in FIG. 6, in Embodiment 3, a second partition plate 203 is further provided to separate the air passage 81 from the installation space 202 for refrigerant pipes, in addition to the first partition plate 200 that separates the air passage 81 from the installation space 201 for the refrigerant detection unit 99. The second partition plate 203 is disposed between the following spaces: a space within the air passage 81 located between the air inlet 112 and the fan casing 108 and the installation space 202 for refrigerant pipes. The second partition plate 203 is disposed perpendicular to the first partition plate 200 and in parallel to the lateral surface of the housing 111. Within the lower space 115a of the housing 111, the second partition plate 203 in the present example extends vertically from the height at which the first partition plate 200 is installed to the height at which the partition unit 20 is installed. The second partition plate 203 may be formed integrally with the first partition plate 200, or may be a component separate from the first partition plate 200. Due to the presence of the second partition plate 203, the air passage 81 and the installation space 202 for refrigerant pipes can be separated from each other inside the housing 111. This makes it possible to prevent foreign gas sucked in through the air inlet 112 from flowing into the installation space 201 for the refrigerant detection unit 99 via the installation space 202 for refrigerant pipes.

As described above, with the air-conditioning apparatus according to Embodiment 3, the indoor unit 1 further includes the second partition plate 203 configured to separate between the air passage 81 and the installation space 202 for refrigerant pipes.

According to the above-mentioned configuration, the air passage 81 and the installation space 202 for refrigerant pipes can be separated from each other, thus preventing foreign gas sucked in through the air inlet 112 from flowing into the installation space 201 for the refrigerant detection unit 99 via the installation space 202 for refrigerant pipes. This ensures that false detection of foreign gas other than refrigerant by the refrigerant detection unit 99 can be prevented more reliably.

The present invention is not limited to the above embodiments, and various modifications are possible.

For example, although the above embodiments are directed to a case in which the indoor unit 1 is of a floor-standing type, the present invention is also applicable to other types of indoor units, such as ceiling cassette type, ceiling concealed type, ceiling suspended type, and wall-mounted type indoor units.

The above-mentioned embodiments and modifications may be implemented in combination with each other.

REFERENCE SIGNS LIST 1 indoor unit 2 outdoor unit 3 compressor 4 refrigerant flow switching device 5 heat source-side heat exchanger 5*f* outdoor fan 6 pressure reducing device 7 load-side heat exchanger 7*f* indoor fan 9*a*, 9*b* indoor pipe 10*a*, 10*b* extension pipe 11 suction pipe 12 discharge pipe 13*a*, 13*b* extension-pipe connection valve 14*a*, 14*b*, 14*c* service port 15*a*, 15*b*, 16*a*, 16*b* fitting 20 partition unit 20*a* air passage opening 21 drain pan 25 electrical component box 26 operating unit 30 controller 40 refrigerant circuit 81 air passage 91 suction air temperature sensor 92 heat exchanger liquid pipe temperature sensor 93 heat exchanger two-phase pipe temperature sensor 99 refrigerant detection unit 107 impeller 108 fan casing 108*a* air outlet opening 108*b* air inlet opening 111 housing 111*a* bottom portion 112 air inlet 112*a* lower open end 113 air outlet 114*a* first front panel 114*b* second front panel 114*c* third front panel 115*a* lower space 115*b* upper space 200 first partition plate 201, 202 installation space 203 second partition plate 210 particulate adsorbing element

What is claimed is:

1. An air-conditioning apparatus comprising:
   a refrigerant circuit configured to circulate refrigerant between an indoor unit and an outdoor unit; and
   the indoor unit including a load-side heat exchanger of the refrigerant circuit,
   wherein the indoor unit includes:
      an air outlet provided in a housing,
      an air inlet provided in the housing below the air outlet and below the load-side heat exchanger,
      an air passage extending between the air inlet and the air outlet via the load-side heat exchanger,
      a drain pan disposed below the load-side heat exchanger and above the air inlet,
      a refrigerant detection unit disposed below the air inlet, and
      a first partition plate configured to separate the air passage from a space in which the refrigerant detection unit is installed, and
   wherein the space is configured to accumulate leaked refrigerant.

2. The air-conditioning apparatus of claim 1,
   wherein the indoor unit further includes a fan casing configured to accommodate a fan,
   wherein an air inlet opening of the fan casing is positioned so as to face the air inlet, and
   wherein the first partition plate separates a space within the air passage between the air inlet and the fan casing from the space in which the refrigerant detection unit is installed.

3. The air-conditioning apparatus of claim 1,
   wherein a refrigerant pipe connected to the load-side heat exchanger is disposed inside the housing beside the air passage, and
   wherein the first partition plate is not provided directly below the refrigerant pipe.

4. The air-conditioning apparatus of claim 3,
   wherein the indoor unit further includes a second partition plate configured to separate the air passage from a space in which the refrigerant pipe is installed.

5. The air-conditioning apparatus of claim 1,
   wherein a particulate adsorbing element is disposed on a surface of the first partition plate adjacent to the air passage.

6. The air-conditioning apparatus of claim 1,
   wherein the first partition plate has a structure which is separate from the drain pan.

* * * * *